US012596553B2

(12) United States Patent
Bouzguarrou et al.

(10) Patent No.: US 12,596,553 B2
(45) Date of Patent: Apr. 7, 2026

(54) TECHNIQUE FOR SPECULATIVELY GENERATING AN OUTPUT VALUE IN ANTICIPATION OF ITS USE BY DOWNSTREAM PROCESSING CIRCUITRY

(71) Applicant: Arm Limited, Cambridge (GB)

(72) Inventors: Houdhaifa Bouzguarrou, Valbonne (FR); Thibaut Elie Lanois, Peymeinade (FR); Guillaume Bolbenes, Vallauris (FR); Jonatan Christoffer Lövgren, Nice (FR)

(73) Assignee: Arm Limited, Cambridge (GB)

( * ) Notice: Subject to any disclaimer, the term of this patent is extended or adjusted under 35 U.S.C. 154(b) by 1148 days.

(21) Appl. No.: 17/518,661

(22) Filed: Nov. 4, 2021

(65) Prior Publication Data

US 2023/0133144 A1     May 4, 2023

(51) Int. Cl.
*G06F 9/38*          (2018.01)

(52) U.S. Cl.
CPC .......... *G06F 9/3861* (2013.01); *G06F 9/3806* (2013.01); *G06F 9/3844* (2013.01)

(58) Field of Classification Search
CPC ....... H03H 17/0223; H03H 2017/0245; H03H 2021/007; H03H 2021/0079; H03H 17/0288; H03H 17/04; G06F 9/3806; G06F 9/3844; G06F 9/3861; G06F 12/0862; G06F 12/0895; G06F 9/3842; G06F 2212/507; G06F 2212/1021; G06F 9/3867; G06N 20/00; G11C 15/00; H04L 45/745; H04L 47/10; G06B 2219/23428; G06B 2219/36548
See application file for complete search history.

(56) References Cited

U.S. PATENT DOCUMENTS

| | | | | | |
|---|---|---|---|---|---|
| 11,860,787 | B2* | 1/2024 | Isen | .................... | G06F 12/0292 |
| 2008/0244213 | A1* | 10/2008 | Flemming | .......... | G06F 11/3433 |
| | | | | | 711/173 |
| 2012/0284463 | A1* | 11/2012 | Srinivasan | ............ | G06F 9/3836 |
| | | | | | 711/E12.017 |
| 2015/0072793 | A1* | 3/2015 | Okabayashi | ............ | A63F 13/46 |
| | | | | | 463/42 |
| 2016/0291980 | A1* | 10/2016 | Ge | ........................ | G06F 9/3824 |

(Continued)

*Primary Examiner* — James Trujillo
*Assistant Examiner* — Maria De Jesus Rivera
(74) *Attorney, Agent, or Firm* — NIXON & VANDERHYE P.C.

(57)          ABSTRACT

There is provided a data processing apparatus and method. The data processing apparatus comprises a filter circuit comprising storage circuitry to store program counter values and to assert a trigger signal in response to a lookup operation using a current program counter value hitting in the storage circuitry. The processing apparatus comprises a processing unit to generate an output in response to the trigger signal. The processing apparatus is provided with resolution circuitry, associated with a downstream processing stage, to determine whether the output is of use, and in that event to assert a false miss indication in the absence of the processing unit having been triggered to produce the output. The filter circuit is configured to maintain a trigger sensitivity metric in dependence on the false miss indication, and the chosen number of bits employed when performing the lookup operation is dependent on the trigger sensitivity metric.

20 Claims, 12 Drawing Sheets

(56)                     References Cited

U.S. PATENT DOCUMENTS

| | | | | |
|---|---|---|---|---|
| 2017/0249085 | A1* | 8/2017 | Airaud | G06F 3/0604 |
| 2019/0303161 | A1* | 10/2019 | Nassi | G06F 9/30054 |
| 2020/0201651 | A1* | 6/2020 | Jumani | G06F 9/30061 |
| 2021/0089318 | A1* | 3/2021 | Liu | G06F 13/1668 |
| 2022/0206955 | A1* | 6/2022 | Keppel | G06F 12/1036 |

* cited by examiner

TECHNIQUE FOR SPECULATIVELY GENERATING AN OUTPUT VALUE IN ANTICIPATION OF ITS USE BY DOWNSTREAM PROCESSING CIRCUITRY

TECHNICAL FIELD

The present invention relates to data processing. More particularly the present invention relates to a data processing apparatus, a non-transitory computer-readable medium to store computer-readable code for fabrication of an apparatus, and a method of operating a data processing apparatus.

BACKGROUND

Data processing apparatuses can be arranged to perform data processing using a plurality of sequential processing stages. In such apparatuses, output values produced at a given processing stage may be used in downstream processing stages that are later in the plurality of sequential processing stages. As a result, a processing unit associated with the given processing stage may be required to produce an output value, to be passed to the downstream processing stage, before it is determined whether or not the downstream processing stage requires that output value. In situations where the downstream processing unit does not require the output value, power that is used by the processing unit at the given processing stage is wasted.

SUMMARY

In some example configurations there is provided a data processing apparatus comprising:

a filter circuit comprising storage circuitry to store information indicative of a default number of bits of program counter values associated with selected instructions, the filter circuit configured, in response to a. current program counter value, to:

perform a lookup operation in the storage circuitry based on a chosen number of bits of the current program counter value; and in response to a hit in the storage circuitry, assert a trigger signal;

a processing unit associated with a given processing stage of a plurality of sequential processing stages, the processing unit configured, in response to the trigger signal, to perform an operation in order to speculatively generate an output value in anticipation of that output value being of use to downstream processing circuitry located in one or more downstream processing stages of the plurality of sequential processing stages, each downstream processing stage being later in the plurality of sequential processing stages than the given processing stage; and resolution circuitry associated with a downstream processing stage of the plurality of sequential processing stages, to determine whether the output value is of use to the downstream processing circuitry, and in that event to assert a false miss indication to the filter circuit in the absence of the processing unit having been triggered to produce the output value, wherein the filter circuit is configured to maintain a trigger sensitivity metric that is updated in dependence on the false miss indication, and the chosen number of bits employed when performing the lookup operation is dependent on the trigger sensitivity metric.

In some example configurations there is provided a non-transitory computer-readable medium to store computer-readable code for fabrication of an apparatus comprising:

a filter circuit comprising storage circuitry to store information indicative of a default number of bits of program counter values associated with selected instructions, the filter circuit configured, in response to a current program counter value, to:

perform a lookup operation in the storage circuitry based on a chosen number of bits of the current program counter value; and in response to a hit in the storage circuitry, assert a trigger signal;

a processing unit associated with a given processing stage of a plurality of sequential processing stages, the processing unit configured, in response to the trigger signal, to perform an operation in order to speculatively generate an output value in anticipation of that output value being of use to downstream processing circuitry located in one or more downstream processing stages of the plurality of sequential processing stages, each downstream processing stage being later in the plurality of sequential processing stages than the given processing stage; and resolution circuitry associated with a downstream processing stage of the plurality of sequential processing stages, to determine whether the output value is of use to the downstream processing circuitry, and in that event to assert a false miss indication to the filter circuit in the absence of the processing unit having been triggered to produce the output value, wherein the filter circuit is configured to maintain a trigger sensitivity metric that is updated in dependence on the false miss indication, and the chosen number of bits employed when performing the lookup operation is dependent on the trigger sensitivity metric.

In some example configurations there is provided a method of operating a data processing apparatus comprising a filter circuit, the filter circuit comprising storage circuitry, the method comprising:

storing, in the storage circuitry, information indicative of a default number of hits of program counter values associated with selected instructions;

in response to a current program counter value:

performing, with the filter circuit, a lookup operation in the storage circuitry based on a chosen number of bits of the current program counter value; and in response to a hit in the storage circuitry, asserting, the filter circuit, a trigger signal;

performing, at a given processing stage of a plurality of processing stages, in response to the trigger signal, an operation in order to speculatively generate an output value in anticipation of that output value being of use to downstream processing circuitry located in one or more downstream processing stages of the plurality of sequential processing stages, each downstream processing stage being later in the plurality of sequential processing stages than the given processing stage;

determining, at a downstream processing stage of the plurality of sequential processing stages, whether the output value is of use to the downstream processing circuitry, and in that event asserting a false miss indication to the filter circuit in the absence of the trigger signal being asserted to produce the output value; and maintaining, by the filter circuit, a trigger sensitivity metric that is updated in dependence on the false miss indication, wherein the chosen number of bits employed when performing the lookup operation is dependent on the trigger sensitivity metric.

BRIEF DESCRIPTION OF THE DRAWINGS

The present invention will be described further, by way of example only, with reference to examples thereof as illustrated in the accompanying drawings, in which.

DESCRIPTION OF EXAMPLES

Figure 1:
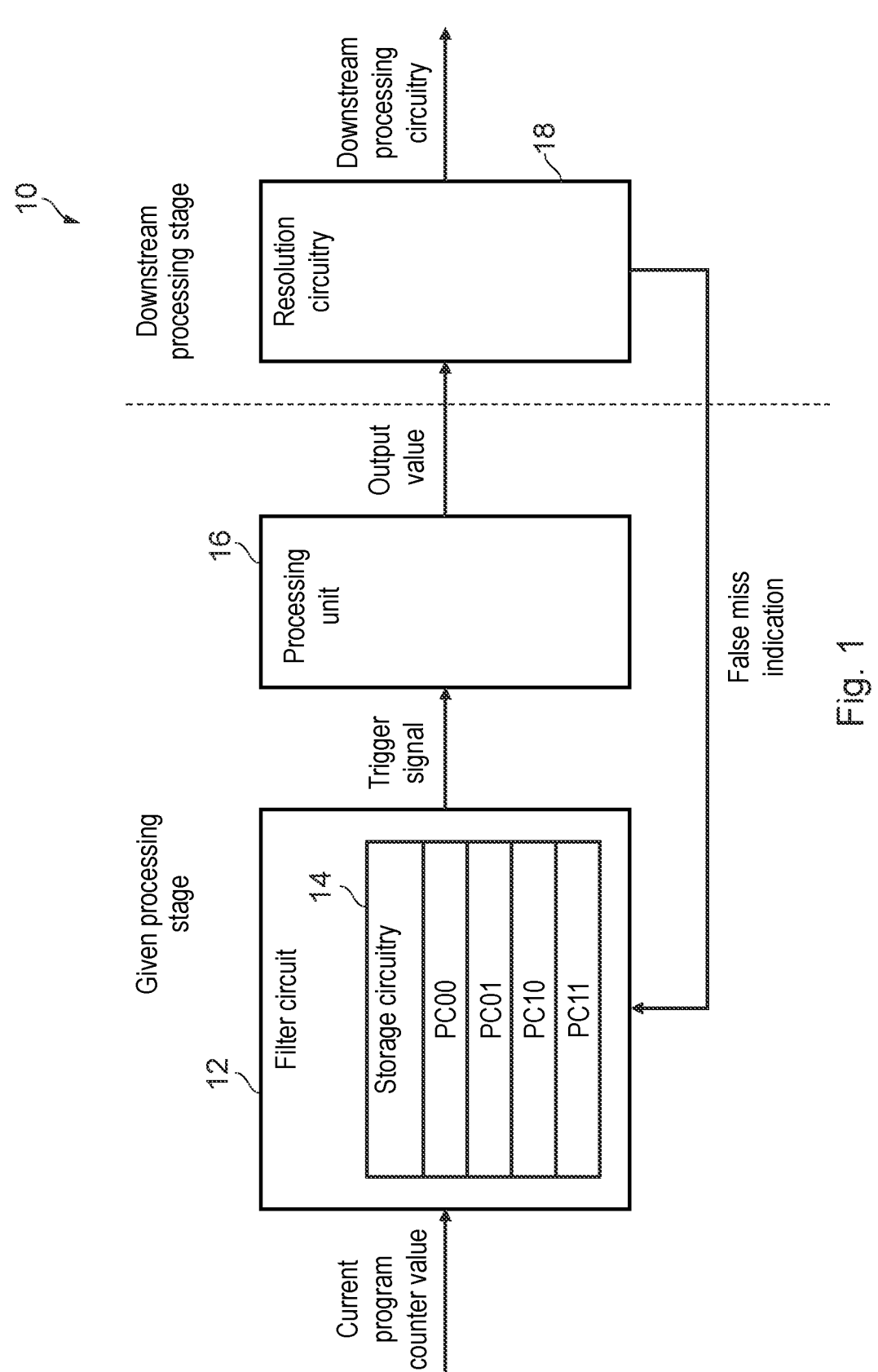
FIG. 1 schematically illustrates a data processing apparatus according to various configurations of the present techniques.

Before discussing example implementations with reference to the accompanying figures, the following description is provided.

In accordance with some example configurations there is provided a data processing apparatus that comprises a filter circuit having storage circuitry to store information indicative of a default number of bits of program counter values associated with selected instructions. The filter circuit is configured, in response to a current program counter value, to perform a lookup operation in the storage circuitry based on a chosen number of bits of the current program counter value. The filter circuit is further configured, in response to a hit in the storage circuitry, to assert a trigger signal. The processing apparatus further comprises a processing unit associated with a given processing stage of a plurality of sequential processing stages. The processing unit is configured, in response to the trigger signal, to perform an operation in order to speculatively generate an output value in anticipation of that output value being of use to downstream processing circuitry located in one or more downstream processing stages of the plurality of sequential processing stages, where each downstream processing stage is later in the plurality of sequential processing stages than the given processing stage. The processing apparatus is also provided with resolution circuitry that is associated with a downstream processing stage of the plurality of sequential processing stages. The resolution circuitry is provided to determine whether the output value is of use to the downstream processing circuitry, and in that event to assert a false miss indication to the filter circuit if the processing unit has not been triggered to produce the output value. The filter circuit is configured to maintain a trigger sensitivity metric that is updated in dependence on the false miss indication, and the chosen number of bits employed when performing the lookup operation is dependent on the trigger sensitivity metric.

The present techniques are concerned with processing apparatuses that are provided with a plurality of sequential processing stages. Such processing apparatuses may be referred to as pipelined processing apparatuses. Instructions that are processed by pipelined processing apparatuses pass through the plurality of sequential processing stages in turn with each of the sequential processing stages performing processing associated with a different instruction before that instruction moves on to the next sequential processing stages. There is therefore a clear flow of instructions through the pipelined processing apparatus with instructions starting at one end of the pipelined processing apparatus and moving sequentially through the processing stages towards the end of the pipelined processing apparatus, In the context of such pipelined processing apparatuses, the terms upstream and downstream are often used to denote a particular relationship between two processing stages of the plurality of sequential processing stages. A processing stage that is upstream from a given processing stage is a processing stage that occurs earlier in the plurality of sequential processing stages than the given processing stage and is therefore encountered by the instructions before the given processing stage. Similarly, a processing stage that is downstream from the given processing stage is a processing stage that occurs later in the plurality of sequential processing stages than the given processing stage and is therefore encountered by the instructions after the given processing stage. References to a downstream processing stage or a downstream processing unit do not necessarily require that the downstream processing stage/unit is a sequentially next processing stage, Rather, the downstream processing stage/unit may be a sequentially next processing stage or may be separated from the given processing stage by one or more intermediate processing stages. Similarly, references to an upstream processing stage or an upstream processing unit do not necessarily require that the upstream processing stage/unit is the sequentially preceding processing stage. Rather, the upstream processing stage/unit may be a sequentially preceding processing stage or may be separated from the given processing stage by one or more intermediate processing stages.

Each processing stage of the plurality of processing stage may perform operations that are required to be performed to ensure functional correctness (which may be referred to as architecturally important operations). In addition each processing stage may perform operations that are non-architecturally important in that failure to perform such an operation will not affect functional correctness. However, failure to perform an operation that is not architecturally important may result in reduced computational efficiency. For non-architecturally important operations, it may not be known whether or not the result of the non-architecturally important operation is required at the time of processing. Therefore, performing a non-architecturally important operation which is subsequently determined, by the resolution circuitry at the downstream processing circuitry, to not be required (a false hit) results in wasted power. On the other hand, failing to perform a non-architecturally important operation when it is determined, by the resolution circuitry at the downstream processing circuitry, that the output of the non-architecturally important operation is required (a false miss) will result in a loss of performance but will not be critical to the functional correctness of the apparatus when executing the instructions within the pipeline.

The inventors of the present techniques have recognised that there is a trade-off between these two options and that a balance can be struck between the requirement of reducing wasted power and minimising false misses and that such a balance can be achieved by providing a filter circuit with a variable trigger sensitivity to trigger the non-architecturally important operation based on a program counter value. The filter circuit is provided with storage circuitry that stores a default number of bits of program counter values for which a trigger should be issued. The filter circuit is configured to perform a lookup in the storage circuitry in response to receipt of a current program counter value that is associated with an instruction or a block of instructions. The lookup is performed using a chosen number of bits of the program counter value (i.e., a number of bits that is less than or equal to the total number of bits of the program counter value). When the lookup hits in the storage circuitry, a trigger is issued to cause a processing unit to perform a non-architecturally important operation. When the lookup does not hit in the storage circuitry, the trigger is withheld (not issued) so that the non-architecturally important operation is not performed.

The inventors have realised that there is a further trade off here. On one hand, providing storage circuitry with a large capacity will increase the accuracy of the filter circuit and reduce the number of false misses. On the other hand, storage circuitry with a larger capacity will result in an increase in the required circuit area and power consumption, in order to be able to provide storage circuitry with a small capacity, the filter circuit is configured to update a trigger sensitivity metric based on false miss indications that are received from the downstream processing circuitry. The trigger sensitivity metric is used by the filter circuitry to determine the chosen number of bits that are to be used in the lookup in the storage circuitry. The chosen number of bits is indicative of a number of bits of the program counter value that are compared to those that are stored in the storage circuitry. If the chosen number of bits decreases then the chance of obtaining a hit in the storage circuitry lookup is increased and the chance of a false miss occurring will be reduced. In some configurations the filter circuit, the storage circuitry and the processing unit are provided as a single functional circuit. In other configurations the filter circuit, the storage circuitry and the processing unit are distinct circuits that interact with one another. The filter circuit and the storage circuitry may be provided in an upstream processing stage of the plurality of processing stages relative to the processing unit or may be provided in the same processing stage.

The filter circuit can be configured to maintain the filter sensitivity metric in a number of different ways. However, in some configurations the filter circuit is configured, when seeking to reduce occurrences of false miss indications, to adjust the trigger sensitivity metric in order to reduce the chosen number of bits employed when performing the lookup operation, thereby increasing a range of program counter values for which the trigger is issued. When the chosen number of bits is equal to the default number of bits a lookup in the storage circuitry, based on a particular program counter value, will only hit in the storage circuitry if each of the default number of bits matches a corresponding bit in the chosen number of bits. If, however, the chosen number of bits is fewer than the default number of bits then the lookup in the storage circuitry will only require that each of the chosen number of bits matches a corresponding bit in the default number of bits. As a result, bits that are stored in the storage circuitry as part of the default number of bits, but that are not part of the chosen number of bits. are not required to match the corresponding bits within the program counter value. In this way, the sensitivity of the trigger metric can be lowered resulting in a greater hit rate for lookups in the storage circuitry.

In some configurations the trigger sensitivity metric itself can be used to directly determine the chosen number of bits. In other configurations the trigger sensitivity metric is used to identify a current trigger sensitivity level of a plurality of trigger sensitivity levels, and the chosen number of bits is dependent on the current trigger sensitivity level. This approach leads to a coarsening of the trigger sensitivity metric such that the trigger sensitivity metric can change within a threshold without affecting the chosen number of bits. In some configurations the trigger sensitivity metric is stored as a binary number and the trigger sensitivity level is determined based on a most significant portion of the trigger sensitivity metric. Hence, changes in the trigger sensitivity metric that do not affect any bits within the most significant portion of the trigger sensitivity level do not affect the chosen number of bits. This approach results in a particularly compact implementation. In other configurations, the filter circuit is configured to store one or more trigger sensitivity level thresholds and the trigger sensitivity level is determined by comparing the trigger sensitivity metric to each of these trigger sensitivity level thresholds. This approach results in greater flexibility in the trigger sensitivity levels because the difference between sequential trigger sensitivity level thresholds can be set by the designer and can vary for different trigger sensitivity levels.

As discussed, the trigger sensitivity level can be modified to increase sensitivity of the trigger based on the false miss indications that are provided by the resolution circuitry. In addition, in some configurations the filter circuit is configured to determine a hit rate of a sequence of lookup operations performed at a lower trigger sensitivity level of the plurality of accuracy levels, and modify the trigger sensitivity metric based on the hit rate. The filter circuit is therefore responsive to receipt of a program counter value to perform a lookup at a current trigger sensitivity level in order to determine whether or not a trigger is to be issued and to perform a lookup at a lower trigger sensitivity level to determine whether the trigger would have been issued at the lower trigger sensitivity level. A number of hits in the storage circuitry based on the lookup at the lower trigger sensitivity level indicates that the trigger sensitivity level may be set too high and that the trigger is being issued too frequently which could result in wasted power. Hence, the filter circuit is configured to maintain a hit rate that is indicative of the number of hits in the storage circuitry based on the lower trigger sensitivity level. In some configurations, the hit rate is only modified in response to an indication from the downstream resolution circuitry that the output value was required. In other words, the hit rate is only modified in response to true hits in the lookup using the lower trigger sensitivity level and false misses in the lookup at the current trigger sensitivity level. The hit rate is not modified in response to a true miss using the lower trigger sensitivity level.

In some configurations the lower trigger sensitivity level is associated with a greater number of bits of the current program counter value than the current trigger sensitivity level. The current trigger sensitivity level uses a subset of the bits of the lower trigger sensitivity level. Hence, a hit in the lower trigger sensitivity level will indicate that there would also be a hit in the current trigger sensitivity level. Therefore, when the hit rate indicates that the lookups at the lower trigger sensitivity level are occurring at a sufficiently high rate, the filter circuit is able to determine that the trigger sensitivity level is set too high and that a lower trigger sensitivity level would result in an adequate level of performance.

The hit rate can be maintained in a variety of different ways. In some configurations, the hit rate can be stored as indicating a fraction of the last N lookups that hit using the lower trigger sensitivity level (where N is an integer greater than 1). In other configurations, the hit rate indicates a number of consecutive hits within the sequence of lookup operations. Hence, a miss in lookup at the lower trigger sensitivity level will result in the hit rate being reset, whilst a hit in the lower trigger sensitivity level will result in the hit rate being incremented. In some configurations, the hit rate is only reset in response to a false miss in the lookup at the lower trigger sensitivity level and is only incremented in response to a true hit in the lookup at the lower trigger sensitivity level.

In some configurations, the filter circuit comprises a decrement counter indicative of the hit rate; and the filter circuit is configured to decrease the trigger sensitivity metric in response to the decrement counter reaching a decrement threshold. Hence, the trigger sensitivity metric is only decreased in response to the number of sequential hits in the lookup at the lower trigger sensitivity reaching the decrement threshold. In some configurations the decrement threshold is set as a fixed value in hardware. In other configurations, the decrement threshold can be set in response to one or more instructions of an instruction set architecture associated with the data processing apparatus.

The filter circuitry can update the filter sensitivity metric in a variety of ways. In some configurations the filter sensitivity metric is incremented by a value of one for each false miss indication. In some configurations the filter circuit is configured, in response to the false miss indication, to increase the filter sensitivity metric by an increment value. The increment value can be a fixed or variable value. The increment value can be greater than one. In some configurations, the increment value is dependent upon the filter sensitivity metric resulting in a non-linear response of the filter sensitivity metric to the false miss indications.

Furthermore, in some configurations, the filter circuit is configured to adjust the increment value in response to one or more given events. In this way the variation of the filter sensitivity metric can be modified based on a state of the processing apparatus, a user defined value, and/or one or more metrics associated with the downstream processing circuitry.

In some configurations the increment value is dependent on an elapsed time since a given modification to the current trigger sensitivity level. The elapsed time can be measured in a variety of ways, for example as a number of clock cycles, a number of instruction cycles, or a number of lookups in the storage circuitry by the filter circuit.

The increment value can be based on the elapsed time in a variety of ways. In some configurations, when the elapsed time is greater than a threshold time, the increment value is a default increment value, and when the elapsed time is less than a threshold time, the increment value is a boosted increment value greater than the default increment value. In this way, subsequent to the given modification, the filter sensitivity metric can be made more responsive to false miss indications for a short time in which the response to false miss indications is accelerated.

For example, in some configurations the given modification to the current trigger sensitivity level is a reduction of the current trigger sensitivity level. Hence, the processing apparatus can respond more quickly to a sequence of false misses when the current trigger level has recently been decreased.

The boosted increment value can, in some configurations, be provided in response to any decrease in the trigger sensitivity level. In some configurations, the reduction of the current trigger sensitivity level is a reduction to a minimum trigger sensitivity level. Hence, the boosted increment value is only applied for a short time after the trigger sensitivity level has dropped to the minimum trigger sensitivity level. The inventors have realised that, in some workflows, a number of instructions that require an increased trigger sensitivity level can temporarily decrease. During this time, the trigger sensitivity level can drop to the lowest trigger sensitivity level. If, as is the case in such workflows, the number of instructions requiring the increased trigger sensitivity level then suddenly increases, the filter circuit may not be able to respond quickly enough using the default increment value. Hence, by providing the boosted increment value in response to the current trigger sensitivity level having recently dropped to the minimum trigger sensitivity level, an improved accuracy of the filter circuit can be achieved and an overall performance of the processing apparatus can be increased.

The processing unit can be any processing unit for which the processing is carried out earlier in the plurality of sequential processing stages than a determination, by resolution circuitry, that the output value from the processing unit is required. However, in some configurations, the processing unit is a polymorphic branch prediction unit arranged to produce, as the output value, a predicted target address for a polymorphic branch instruction. In such an implementation, the apparatus may further comprise a branch target buffer to predict branch target addresses for branch instructions, wherein the branch target buffer is further arranged, for the current program counter value, to output, for reference by the resolution circuitry, a confirmation of whether the output value is of use to the downstream processing circuitry. A polymorphic branch prediction unit is a particular type of branch prediction unit that is used to predict a target address for a polymorphic branch instruction. A polymorphic branch instruction is an instruction whose branch target can vary between different instances of execution of that same branch instruction. As a result conventional branch target buffers struggle to accurately predict an outcome of such polymorphic branch instructions. In order for the predicted target address to be usable by the processing apparatus, it is necessary for the polymorphic branch prediction unit to perform processing to determine the predicted target address upstream of (prior to) a determination, by the resolution circuitry and based on the confirmation from the branch target buffer, as to Whether the predicted target address is required. Therefore, the polymorphic branch prediction unit is triggered speculatively based on the trigger being issued by the filter circuit. Hence, the data processing apparatus of the present techniques provides a particularly compact circuit for dynamically determining whether to trigger the polymorphic branch prediction unit to output the predicted target address.

The default number of bits can be variously defined and, in some configurations the default number of bits is a contiguous default number of bits. The default number of bits can be all of the bits of the program counter values or fewer bits than a number of bits used to store the program counter values.

The chosen number orbits can be variously defined and, in some configurations, can be a contiguous or non-contiguous set of bits of the program counter values and can vary dependent on the trigger sensitivity level. In some configurations the chosen number of bits is one of: a number of most significant bits of the default number of bits; and a number of least significant bits of the default number of bits. When the chosen number of bits is a number of most significant bits of the default number of bits, increasing the trigger sensitivity level, which results in a reduction in the number of chosen bits, results in a broadening of the range of program counter values local to the stored value for which the lookup will hit in the storage circuitry. When the chosen number of bits is a number of least significant bits of the default number of bits, increasing the trigger sensitivity level, which results in a reduction in the number of chosen bits, results in the lookup hitting in the data storage for a sequence of strided (non-contiguous) program counter values.

The output value produced as a result of a false hit detected by the resolution circuitry can, in some configurations, be stored for subsequent use. However, in some configurations the resolution circuitry is configured, in response to the processing unit having been triggered to produce the output value and a determination that the output value is not of use, to discard the output value.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular examples will now be described with reference to the figures.

FIG. 1 schematically illustrates a data processing apparatus 10 according to various configurations of the present techniques. The data processing apparatus 10 is arranged to use a plurality of processing stages including a given processing stage and a downstream processing stale. Each instruction is processed first by the given processing stage and then, subsequently, by the downstream processing stage. In the given processing stage there is provided: filter circuitry 12 and a processing unit 16. In the downstream processing stage there is resolution circuitry 18. The filter circuit 12 is arranged to receive a current program counter value that is associated with an instruction or block of instructions that is being processed by the given processing stage. The filter circuit 12 is provided with storage circuitry 14 and, in response to receiving the current program counter value, is arranged to perform a lookup in the storage circuitry 14. In the illustrated example the storage circuitry 14 comprises four entries: Program Counter (PC) value PC00, PC01, PC10, and PC11. The program counter values stored in the storage circuitry 14 comprise a default number of bits of the program counter value. The lookup performed by the filter circuit 12 in the storage circuitry 14 is performed by comparing a chosen number of bits of the current program counter value with each of the program counter values PC00, PC01, PC10, and PC11 that are stored in the storage circuitry 14. When a match is found, i.e., the lookup hits in the storage circuitry 14, the filter circuit 12 is arranged to output a trigger signal that causes the processing unit 16 to perform an operation associated with the current program counter value and to output an output value that is passed to the downstream processing stage. When the processing of the instruction associated with the current program counter value, by the given processing stage, is complete, the results of the processing carried out at the given processing stage are passed to the downstream processing stage. Then, subsequently, the downstream processing stage begins processing the instruction. The output value that is produced by the processing unit 16 is received by the resolution circuitry 18. The resolution circuitry 18 determines, based on information that is available at the downstream processing stage, whether or not the output value was required (true hit) or was not required (false hit) and passes the output value on to other downstream processing circuitry.

On the other hand, if no match was found during the lookup performed by the filter circuit 12 in the storage circuitry 14, the filter circuit is arranged to suppress (not supply) the trigger signal to the processing unit 16, The processing unit 16 therefore does not perform an operation for the current program counter value and no output value is produced. Subsequently, at the downstream processing stage, there is no output value to be received by the resolution circuitry 18. The resolution circuitry determines, based on information that is available at the downstream processing stage, whether or not the output value was required (false miss) or was not required (true miss). In the event of a false miss, the resolution circuitry generates a false miss indication that is passed back to the filter circuit 12. The filter circuit 12 receives the false miss indication and updates a trigger sensitivity metric, The trigger sensitivity metric that is updated by the filter circuit 12 is used to determine the chosen number of bits that is used to perform subsequent lookups in the storage circuitry 14.

In the illustrated configuration the downstream processing stage is sequentially immediately after the given processing stage. However, in alternative configurations, there may be additional processing stages between the given processing stage and the downstream processing stage. In further alternative configurations the filter circuit 12 and the processing unit 16 are arranged in different processing stages of the plurality of processing stages.

Figure 2:
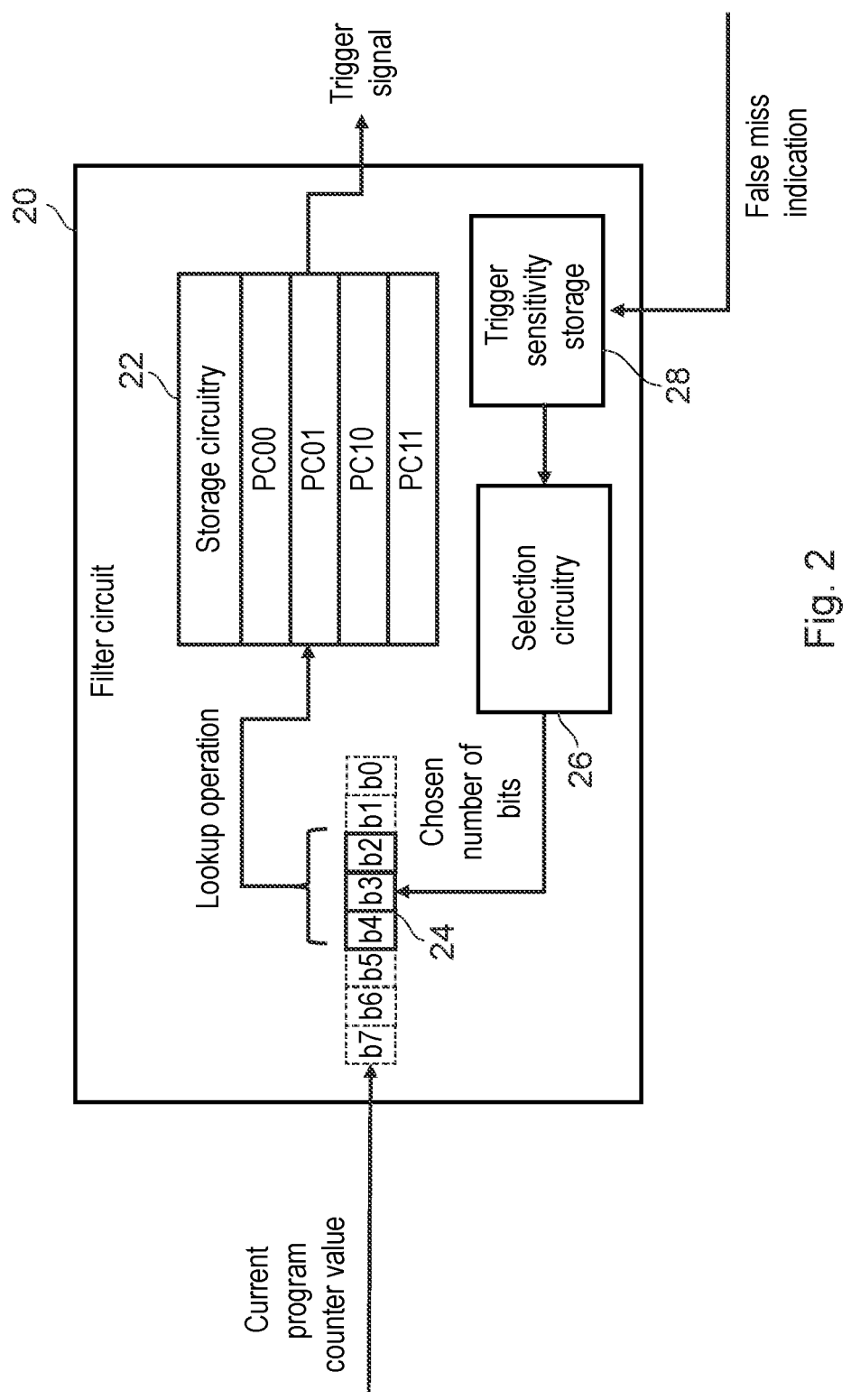
FIG. 2 schematically illustrates details of a filter circuit according to various configurations of the present techniques.

FIG. 2 schematically illustrates details of a filter circuit 20 according to various configurations of the present techniques. The filter circuit 20 is provided with storage circuitry 22, selection circuitry 26 to select a current trigger sensitivity level, and trigger sensitivity storage 28 to store the trigger sensitivity metric. The filter circuit 20 receives a program counter value 24 and performs the lookup operation using a chosen number of bits based on a current trigger sensitivity level that is determined by the selection circuitry 26. The trigger sensitivity metric, stored in the trigger sensitivity storage, comprises a counter indicative of a current fine grained sensitivity of the trigger. The trigger sensitivity storage is updated based on a number of false miss indications that are received from the downstream processing stage. The selection circuitry 26 takes, as an input, the current trigger sensitivity metric and determines a trigger sensitivity level. The trigger sensitivity level determines a chosen number of bits of the current program counter value 24 that are to be used to perform the lookup operation in the storage circuitry 22. In the illustrated configuration, the current program counter value 24 is an 8 bit value comprising bits [b7, b6, b5, b4, b3, b2, b1, and b0] where b7 is the most significant bit of the current program counter value 24 and b0 is the least significant bit of the current program counter value 24. In the illustrated configuration, the chosen number of bits is three and corresponds to bits b4, b3, and b2 of the current program counter value 24. These three bits are compared with the corresponding bits in the stored program counter values PC00, PC01, PC10, and PC11, that are stored in the storage circuitry 22. When the lookup operation, based on the chosen number of bits, hits in the storage circuitry 22, the trigger signal is issued to the downstream processing unit.

Figure 3:
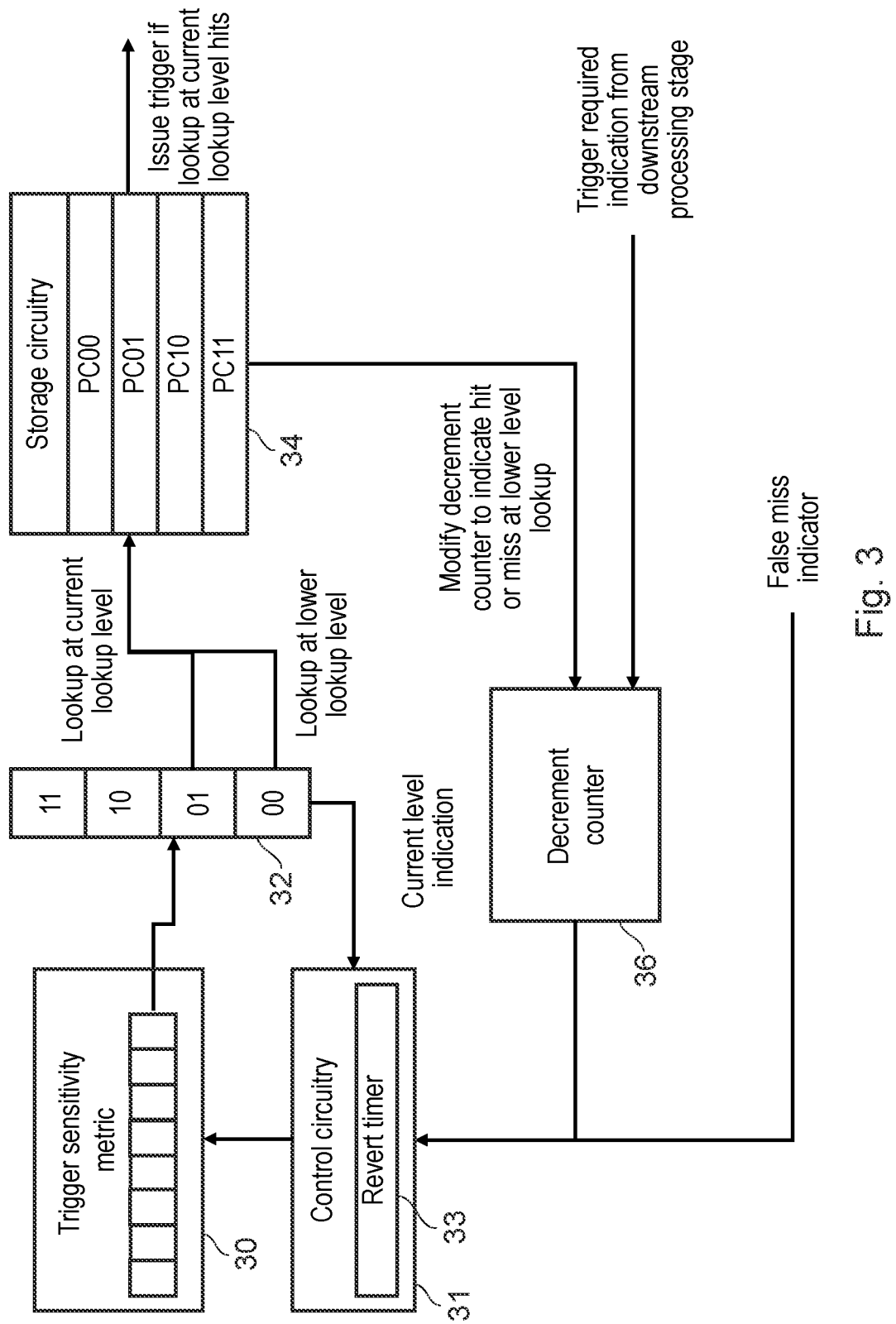
FIG. 3 schematically illustrates the use of a plurality of different trigger sensitivity levels according to various configurations of the present techniques.

FIG. 3 schematically illustrates the use of a plurality of different trigger sensitivity levels 32 according to various configurations of the present techniques. In the illustrated configuration four trigger sensitivity levels 32 are provided and a trigger is issued when a current lookup level hits in the storage circuitry 34. The current lookup level is determined from the plurality of trigger levels 32 based on a current value of the trigger sensitivity metric. In the illustrated configuration the trigger sensitivity metric 30 is stored as an 8 bit number which is compared against the trigger sensitivity levels 32 to determine the current lookup level. The trigger sensitivity levels are a sequence of threshold values comprising trigger sensitivity level 00, trigger sensitivity level 01, trigger sensitivity level 10 and trigger sensitivity level 11. When the trigger sensitivity metric 30 is below a first threshold then trigger sensitivity level 00 is used. When the trigger sensitivity metric 30 is above or equal to the first threshold but below a second threshold then trigger sensitivity level 01 is used. When the trigger sensitivity metric 30 is above or equal to the second threshold but below a third threshold then trigger sensitivity level 10 is used. When the trigger sensitivity metric 30 is above the third threshold then trigger sensitivity level 11 is used. As the trigger sensitivity level is increased a number of bits of the current program counter value that are used to perform the lookup in the storage circuitry 34 is decreased. When the trigger sensitivity level 00 is used a first number of chosen bits of the current program counter value are used to perform a lookup in the storage circuitry 34. When the trigger sensitivity level 01 is used then a second number of chosen bits of the current program counter value that is fewer than the first number of chosen bits of the current program counter is used to perform the lookup in the storage circuitry 34. When the trigger sensitivity level 10 is used then a third number of chosen bits of the current program counter value that is fewer than the second number of chosen bits of the current program counter value is used to perform the lookup in the storage circuitry. When the trigger sensitivity level 11 is used a fourth number of chosen bits of the current program counter value is used that is fewer than the third number of chosen bits of the current program counter value.

As discussed, in relation to FIG. 1 and FIG. 2, the trigger sensitivity metric is increased in response to a false miss indicator. In addition, the trigger sensitivity metric 30 is also decreased in response to a decrement counter 36 indicating that a decrement threshold has been reached. The filter circuit is arranged to perform, in addition to the lookup at the current lookup level, a lookup at a lower lookup level in the storage circuitry 34. The decrement counter 36 receives an indication from the storage circuitry 34 as to whether the lookup at the lower lookup level resulted in a hit or a miss in the storage circuitry 34. The decrement counter stores an indication as to whether the lookup in the lower level resulted in a hit or a miss in the storage circuitry 34. Subsequently, the decrement counter 36 receives an indication from the downstream processing stage as to whether the trigger was required or was not required. When it is determined that the trigger was required and that the lower level lookup in the storage circuitry 34 resulted in a hit (true hit at lower lookup level) the decrement counter 36 is incremented. When it is determined that the trigger was required but that the lower level lookup in the storage circuitry 34 missed (false miss at lower level lookup) then the decrement counter is reset. When it is determined that the trigger was not required then the indication as to whether the lookup in the lower level resulted in a hit or a miss in the storage circuitry 34 is discarded and the decrement counter 36 is maintained at a current value. A sequence of true hits at the lower lookup level indicates that the current lookup level may be set too high. Hence, when the decrement counter 36 reaches a decrement threshold an indication is sent to the control circuitry 31.

The amount by which the trigger sensitivity metric is incremented or decremented is determined by control circuitry 31. The control circuitry comprises a revert timer 33 which is triggered when the current trigger sensitivity level is decreased to the lowest trigger sensitivity level. The revert timer 33 is active for a period of time after being triggered. The control circuitry 31 is arranged, in response to a false miss indication and when the revert timer 33 is not set, to increase the trigger sensitivity metric 30 by a default amount. The control circuitry 31 is arranged, in response to a false miss indication and when the revert timer 33 is set, to increase the trigger sensitivity metric 30 by a boosted amount that is greater than the default amount. The control circuitry 31 is also arranged, in response to an indication from the decrement counter 36 that the decrement counter has reached a decrement threshold, to decrease the trigger sensitivity metric 30 by a default decrement amount independent of a state of the revert timer 33.

Figure 4:
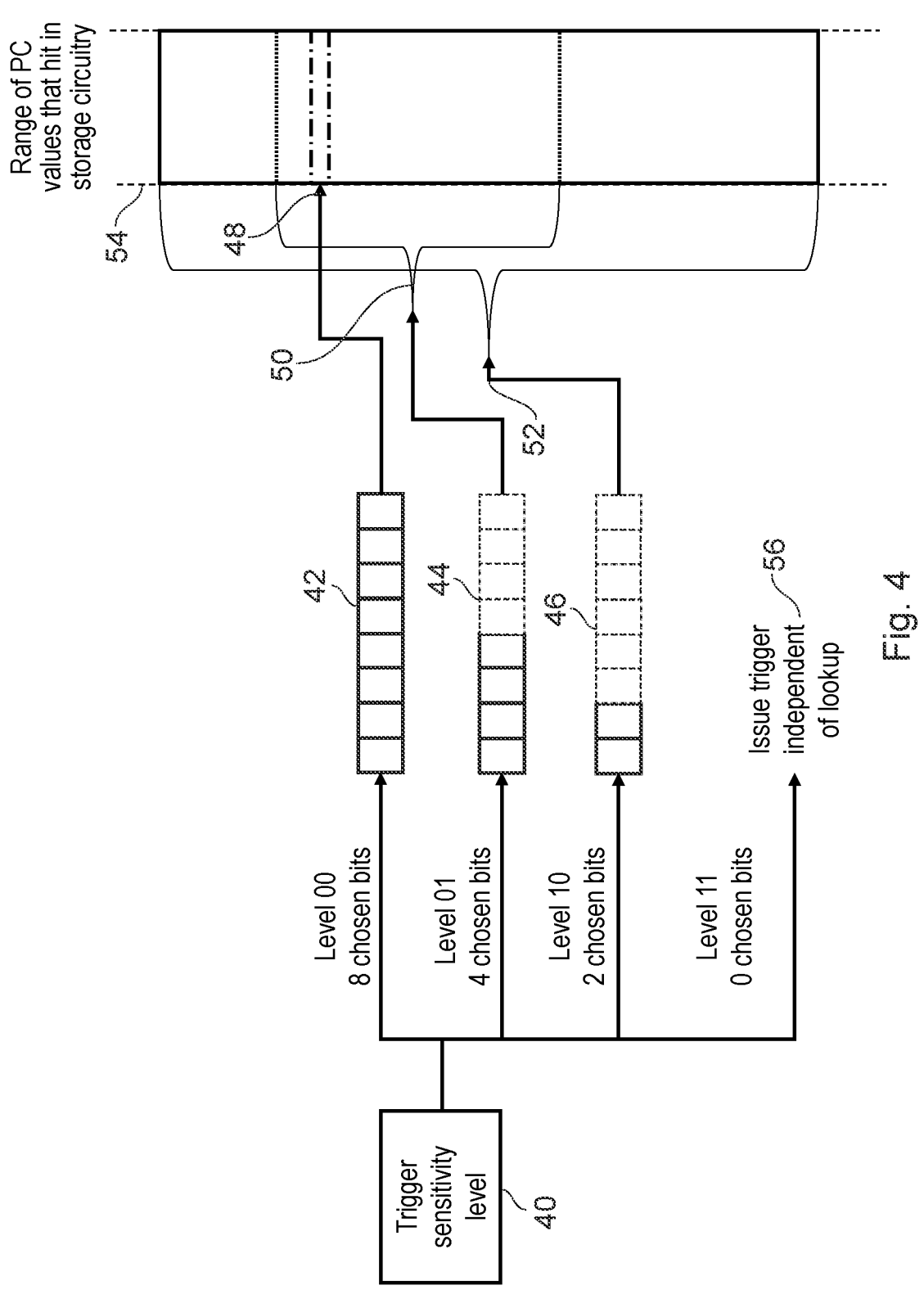
FIG. 4 schematically illustrates the effect of modifying the trigger sensitivity level on a number of chosen bits to be used to perform a lookup according to various configurations of the present techniques.

FIG. 4 schematically illustrates the effect of modifying the trigger sensitivity level on a number of chosen bits to be used to perform a lookup according to various configurations of the present techniques. The filter circuit determines a chosen number of bits to perform the current level lookup based on the trigger sensitivity level 40. When the current trigger sensitivity level 40 is trigger sensitivity level 00, the number of bits that are used is eight bits 42 which corresponds to the default number of hits stored in the storage circuitry. Using all eight bits of the current program counter value requires that all of the default number of bits that are stored in the storage circuitry 34 are the same as the corresponding bits of the current program counter value. As a result, the current level lookup will only hit for a small range of program counter values 48. Where the default number of hits of the program counter value is all the bits of the program counter value, the range of program counter values 48 that would result in a hit in the storage circuitry 34 is only a single program counter value. However, where the default number of hits is fewer than the total number of bits of a program counter value, then the range of program counter values 48 that would result in a hit in the storage circuitry 34 corresponds to more than a single program counter value. For example if the default number of bits of the program counter value is all bits except for the three least significant bits, then the range of program counter values 48 is 8 different program counter values.

When the current trigger sensitivity level 40 is trigger sensitivity level 01, the number of bits that are used is four bits. In the illustrated configuration, the filter circuit is arranged to use the four most significant bits 44 of the default number of bits. Using the four most significant bits of the current program counter value requires that the four most significant bits of the default number of bits that are stored in the storage circuitry 34 are the same as the corresponding four most significant bits of the current program counter value. As a result, the current level lookup will result in a hit for a larger range of program counter values 50 than the case in which all eight of the default number of bits of the program counter value were used. Where the default number of bits of the program counter value is all the bits of the program counter value, the range of program counter values 50 that would result in a hit in the storage circuitry 34 is sixteen program counter values. However, where the default number of bits is fewer than the total number of bits of a program counter value, then the range of program counter values 50 that would result in a hit in the storage circuitry 34 corresponds to a larger range of program counter values. For example if the default number of bits of the program counter value is all bits except for the three least significant bits, then the range of program counter values 50 is equal to $2^{(4+3)}=128$ different program counter values.

When the current trigger sensitivity level 40 is trigger sensitivity level 10, the number of bits that are used is two bits. In the illustrated configuration, the filter circuit is arranged to use the two most significant bits 46 of the default number of bits. Using the two most significant bits of the current program counter value requires that the two most significant bits of the default number of bits that are stored in the storage circuitry 34 are the same as the corresponding two most significant bits of the current program counter value. As a result, the current level lookup will result in a hit for a larger range of program counter values 52 than the case in which all eight of the default number of bits of the program counter value were used and the case in which the four most significant bits of the default number of bits were used. Where the default number of bits of the program counter value is all the bits of the program counter value, the range of program counter values 52 that would result in a hit in the storage circuitry 34 is 64 program counter values. However, where the default number of bits is fewer than the total number of bits of a program counter value, then the range of program counter values 52 that would result in a hit in the storage circuitry 34 corresponds to a larger range of program counter values. For example if the default number of bits of the program counter value is all bits except for the three least significant bits, then the range of program counter values 52 is equal to $2^{(6+3)}=512$ different program counter values.

When the current trigger sensitivity level 40 is trigger sensitivity level 11, then no lookup is performed 56 and the trigger is issued independent of the lookup. As a result, when trigger sensitivity level 11 is used, any program counter value will result in the trigger being issued.

Figure 5A:
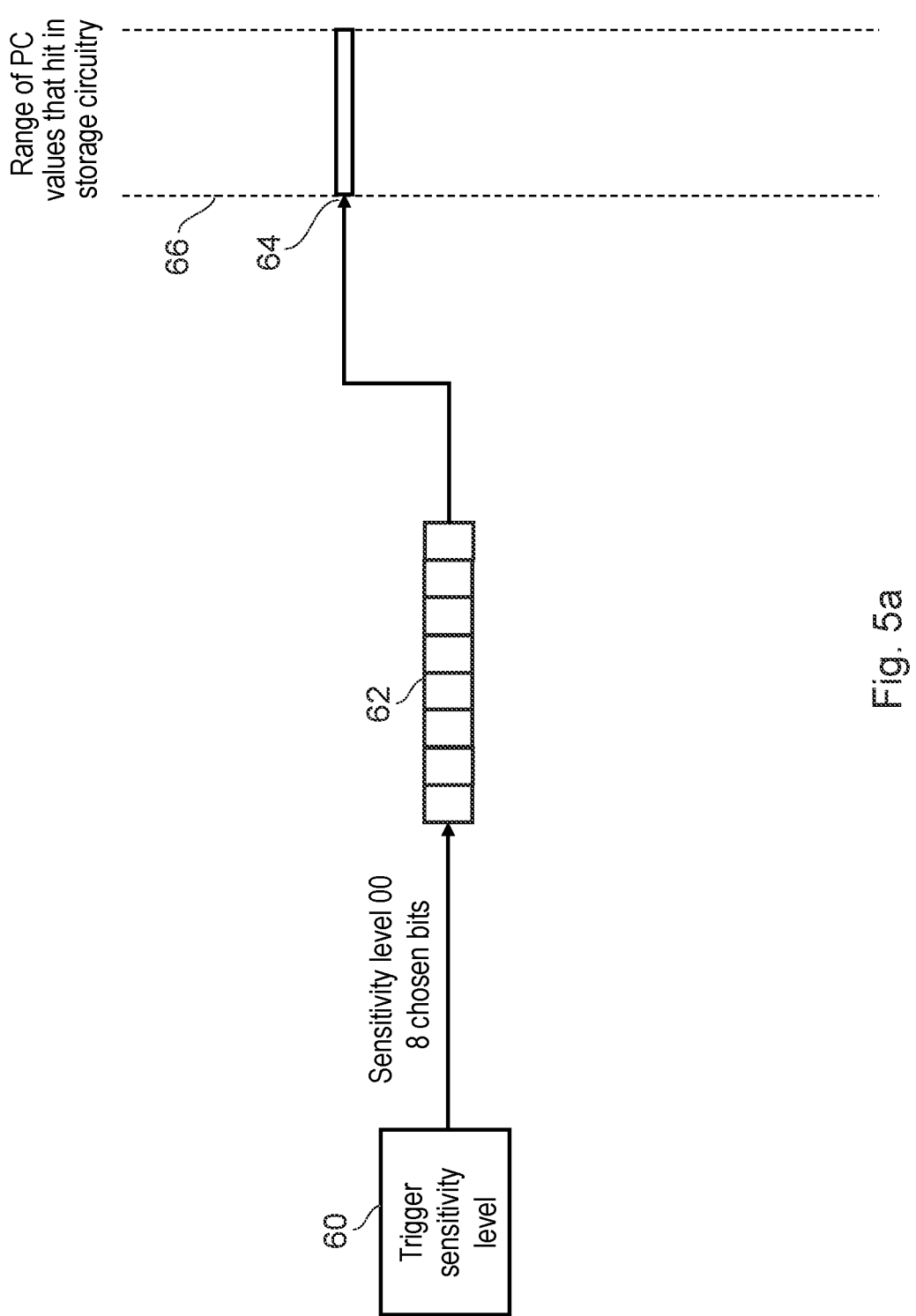
FIG. 5a schematically illustrates the effect of modifying the trigger sensitivity level on a number of chosen bits to be used to perform a lookup according to various configurations of the present techniques.
Figure 5B:
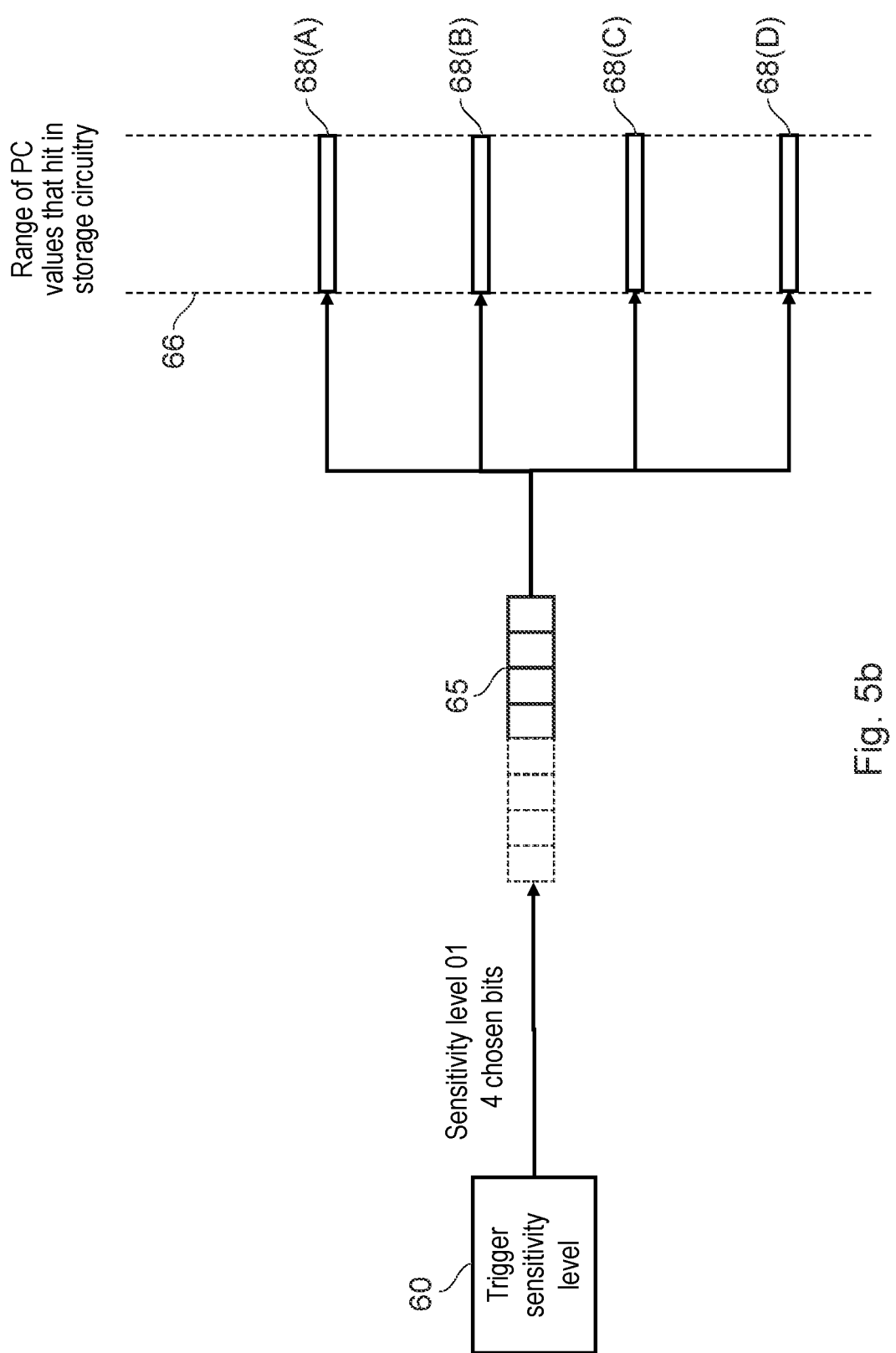
FIG. 5b schematically illustrates the effect of modifying the trigger sensitivity level on a number of chosen bits to be used to perform a lookup according to various configurations of the present techniques.
Figure 5C:
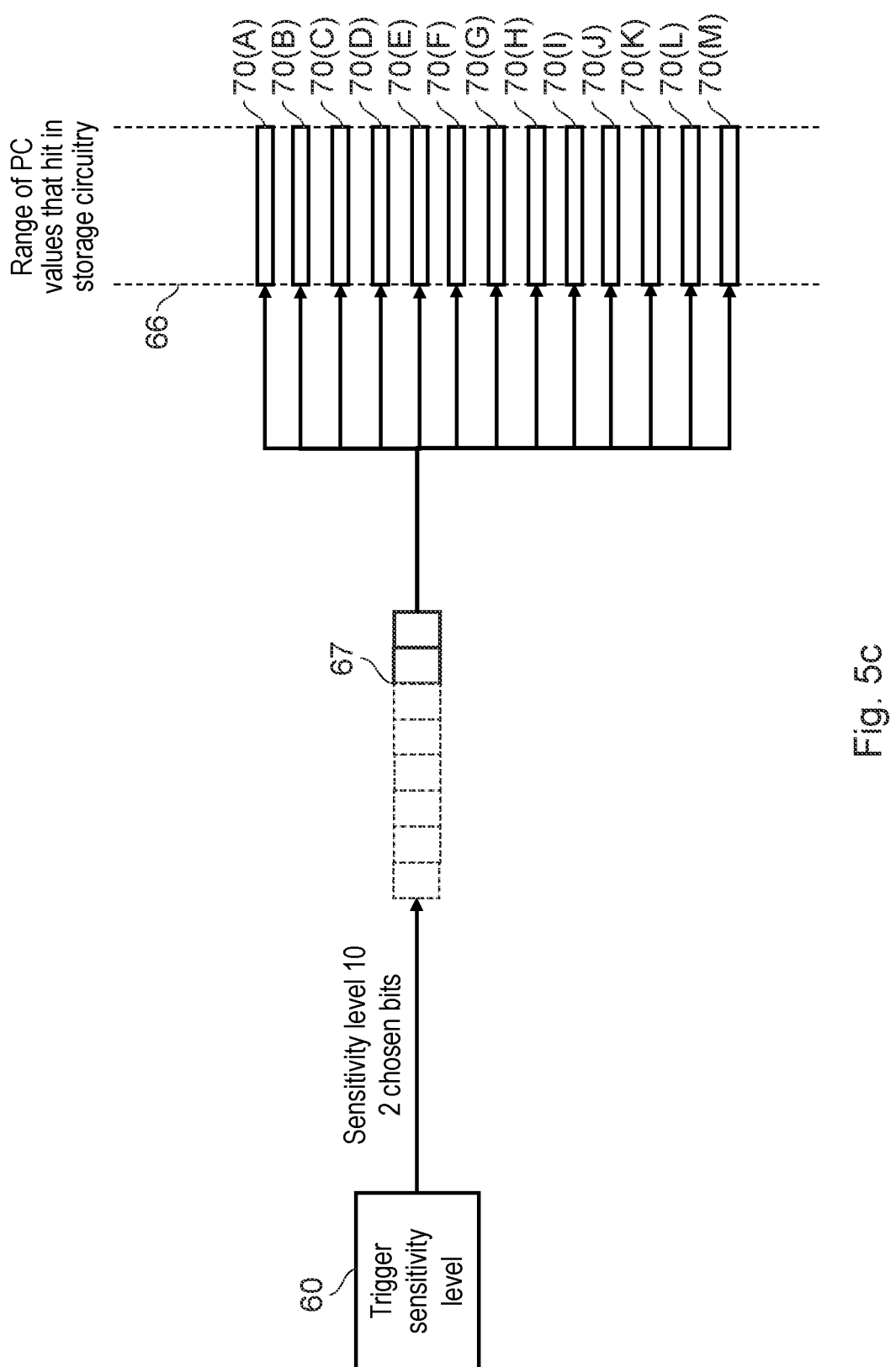
FIG. 5c schematically illustrates the effect of modifying the trigger sensitivity level on a number of chosen bits to be used to perform a lookup according to various configurations of the present techniques.

In the illustrated configuration, four different trigger sensitivity levels are shown and the default number of bits is 8. However, in alternative configurations more or fewer sensitivity levels can be provided and a larger or smaller default number of bits can be chosen, FIGS. 5a to 5c schematically illustrate the case where, instead of using a chosen number of most significant bits of the default number of bits, the chosen number corresponds to a chosen number of least significant bits of the default number of bits. In particular, FIG. 5*a* schematically illustrates a case in which the trigger sensitivity level results in all 8 bits of the default number of bits being used as the chosen number of bits 62. This case is conceptually the same as discussed in relation to level 00 being chosen in FIG. 4.

FIG. 5*b* schematically illustrates a range of program counter values that result in a hit when the trigger sensitivity level is increased and the chosen bits correspond to the four least significant bits 65. When the current trigger sensitivity level 60 is trigger sensitivity level 01, the number of bits that are used is four bits. In the illustrated configuration, the filter circuit is arranged to use the four least significant bits 65 of the default number of bits. Using the four least significant bits of the current program counter value requires that the four least significant bits of the default number of bits that are stored in the storage circuitry 34 are the same as the corresponding four least significant bits of the current program counter value. As a result, the current level lookup will result in a hit for a larger range of program counter values 68 than the case in which all eight of the default number of bits of the program counter value were used. However, in contrast to FIG. 4, where the range of program counter values that hit in the storage circuitry was a contiguous range, where the chosen number of bits are the four least significant bits, the range of values that will result in a hit in the storage circuitry is a strided sequence of program counter values 68. Where the default number of bits of the program counter value is all the bits of the program counter value, the range of program counter values 68 that would result in a hit in the storage circuitry 34 is sixteen single program counter values non-contiguously distributed throughout the range of possible program counter values. in particular, program counter value 68(A) is a single program counter value, program counter value 68(B) is a single program counter value, program counter value 68(C) is a single program counter value, and program counter value 68(D) is a single program counter value. Further values that would result in a hit in the range of program counter values are possible but have been omitted from the figure for clarity of presentation. However, where the default number of bits is fewer than the total number of bits of a program counter value, then the range of program counter values 68 that would result in a hit in the storage circuitry 34 corresponds to a larger range of program counter values. For example if the default number of bits of the program counter value is all bits except for the three least significant hits, then each of the regions of program counter values 68 that would hit in the storage circuitry comprises eight possible program counter values.

FIG. 5*c* schematically illustrates a range of program counter values that result in a. hit when the trigger sensitivity level is increased and the chosen bits correspond to the two least significant bits 67. When the current trigger sensitivity level 60 is trigger sensitivity level 10, the number of bits that are used is two bits. In the illustrated configuration, the filter circuit is arranged to use the two least significant bits 67 of the default number of bits. Using the two least significant bits of the current program counter value requires that the two least significant bits of the default number of bits that are stored in the storage circuitry 34 are the same as the corresponding two least significant bits of the current program counter value. As a result, the current level lookup will result in a hit for a larger range of program counter values 70 than the case in which all eight of the default number of bits of the program counter value were used and the case in which the four least significant bits of the program counter value were used. Where the default number of bits of the program counter value is all the bits of the program counter value, the range of program counter values 70 that would result in a hit in the storage circuitry 34 is 64 single program counter values non-contiguously distributed throughout the range of possible program counter values. In particular, each of program counter values 70(A) to 70(M) are a single program counter value. Further values that would result in a hit in the range of program counter values are possible but have been omitted from the figure for clarity of presentation. However, where the default number of bits is fewer than the total number of bits of a program counter value, then the range of program counter values 70 that would result in a hit in the storage circuitry 34 corresponds to a larger range of program counter values. For example if the default number of bits of the program counter value is all bits except for the three least significant bits, then each of the regions of program counter values 70 that would hit in the storage circuitry comprises eight possible program counter values.

Figure 5D:
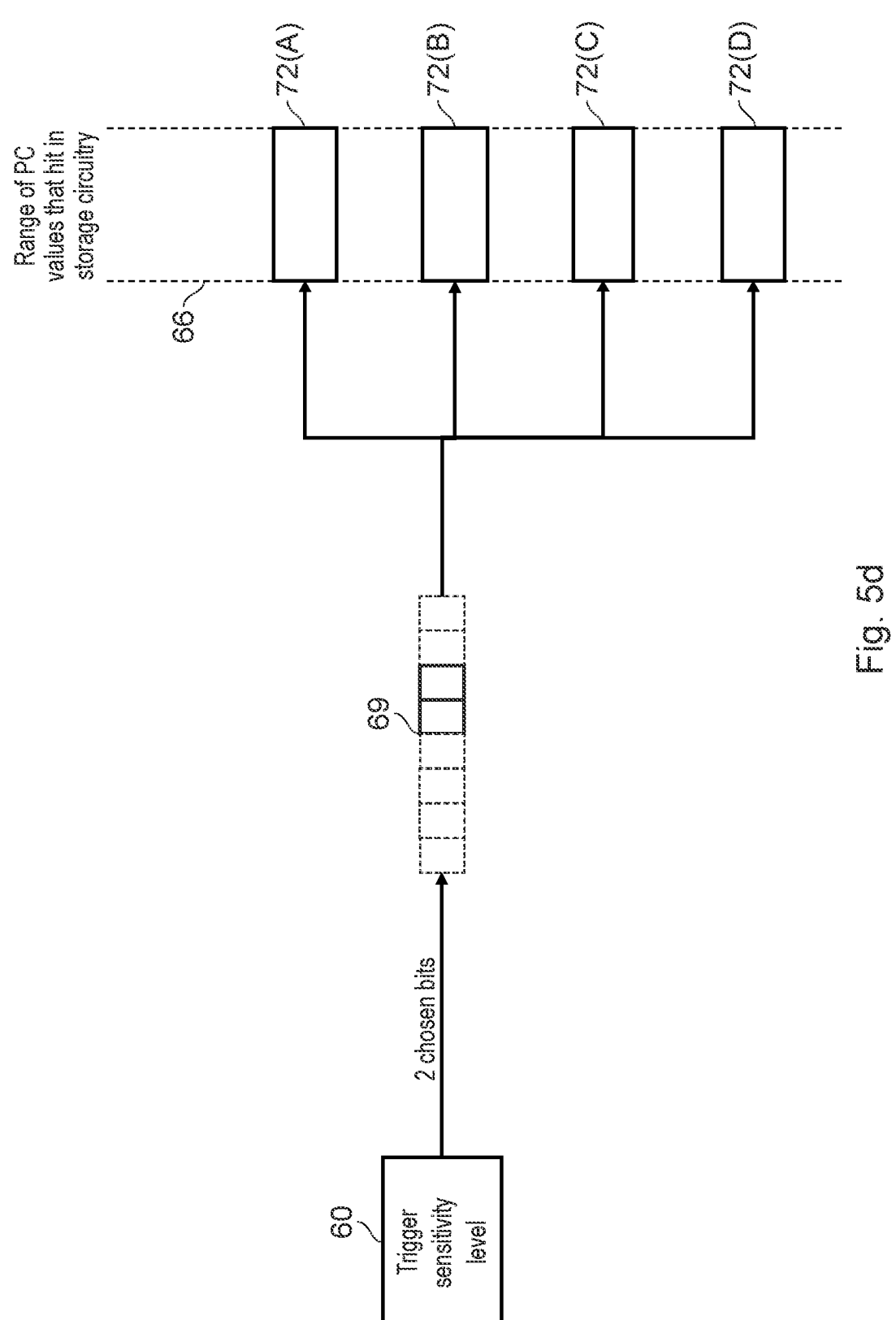
FIG. 5d schematically illustrates the effect of modifying the trigger sensitivity level on a number of chosen bits to be used to perform a lookup according to various configurations of the present techniques.

FIG. 5*d* schematically illustrates a range of program counter values that result in a hit when the trigger sensitivity level is increased and the chosen bits correspond to the two bits 69 taken from the middle of the default number of bits. Using two bits 69 taken from the middle of the default number of bits of the current program counter value requires that two bits 69 taken from the middle of the default number of bits that are stored in the storage circuitry 34 are the same as the corresponding two bits 69 taken from the middle of the default number of bits of the current program counter value. As a result, the current level lookup will result in a hit for a larger range of program counter values 70 than the case in which all eight of the default number of bits of the program counter value were used and the case in which the four least significant bits of the program counter value were used. Where the default number of bits of the program counter value is all the bits of the program counter value, the range of program counter values 72 that would result in a hit in the storage circuitry 34 is 16 ranges of program counter values non-contiguously distributed throughout the range of possible program counter values. In particular, each range of program counter values 72(A) to 72(D) are a range of four contiguously distributed program counter values. Further values that would result in a hit in the range of program counter values are possible but have been omitted from the figure for clarity of presentation. However, where the default number of bits is fewer than the total number of bits of a program counter value, then the range of program counter values 72 that would result in a hit in the storage circuitry 34 corresponds to a larger range of program counter values. For example if the default number of bits of the program counter value is all bits except for the three least significant hits, then each of the regions of program counter values 72 that would hit in the storage circuitry comprises 32 possible program counter values.

Figure 6:
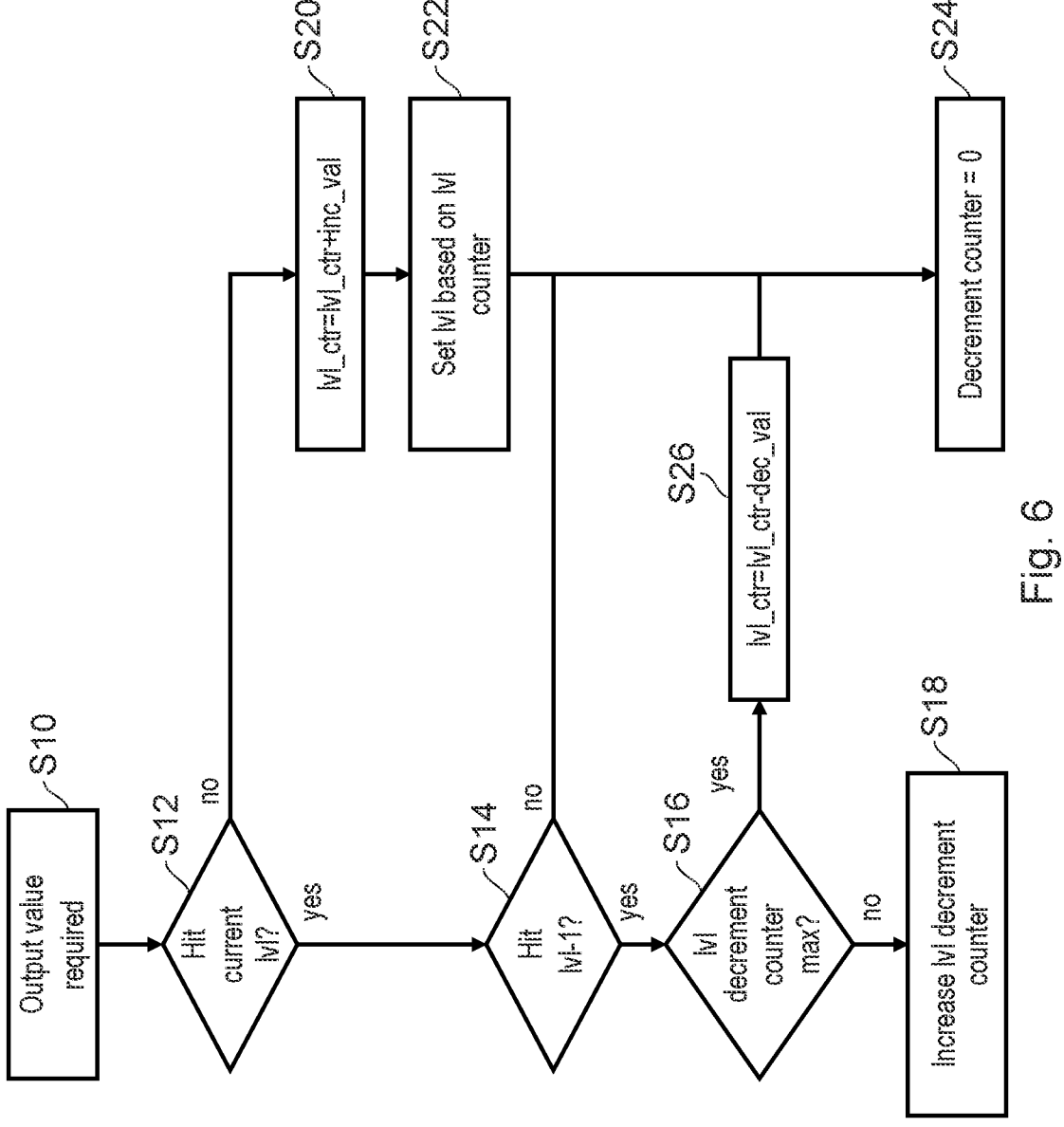
FIG. 6 schematically illustrates a sequence of steps that are carried out by a processing apparatus according to various configurations of the present techniques.

FIG. 6 schematically illustrates a sequence of steps that are carried out by a processing apparatus according to various configurations of the present techniques in order to dynamically update the level counter. Flow begins at step S10 where it is determined, by the downstream processing circuitry, that an output value from the processing unit was required. Flow then proceeds to step S12 where it is determined if there was a hit in the current lookup level (hit current lvl). If yes (true hit at current lookup level), then flow proceeds to step S14 where it is determined if there was also a hit in the lower lookup level (hit lvl-1). If yes (true hit at lower lookup level) then flow proceeds to step S16. At step S16 it is determined if the decrement counter has reached a maximum. If the decrement counter is not at a maximum value then flow proceeds to step S18 where the decrement counter is increased and the flow terminates. In this case, the trigger sensitivity level is not modified as a result of the output value being required. If on the other hand, at step S16, it was determined that the level decrement counter was at the maximum, then flow proceeds to step S26 where the trigger sensitivity metric (lvl_ctr) is decremented by a decrement value. Flow then proceeds to step S24 where the decrement counter is reset and the flow terminates. If on the other hand, at step S14 it was determined that there was not a hit in the lower level lookup (false miss at lower lookup level), then flow proceeds directly to step S24 where the decrement counter is reset and the flow terminates, in this case, the trigger sensitivity metric is not modified as a result of the output value being required. If on the other hand, at step S12 it was determined that there was not a hit in the current lookup level (false miss at current lookup level) then flow proceeds to step S20 where the trigger sensitivity metric (level counter) is incremented by an increment value. Flow then proceeds to step S22 where the current lookup level is determined based on the trigger sensitivity metric (lvl counter). Flow then proceeds to step S24 where the decrement counter is reset and the flow terminates.

Figure 7:
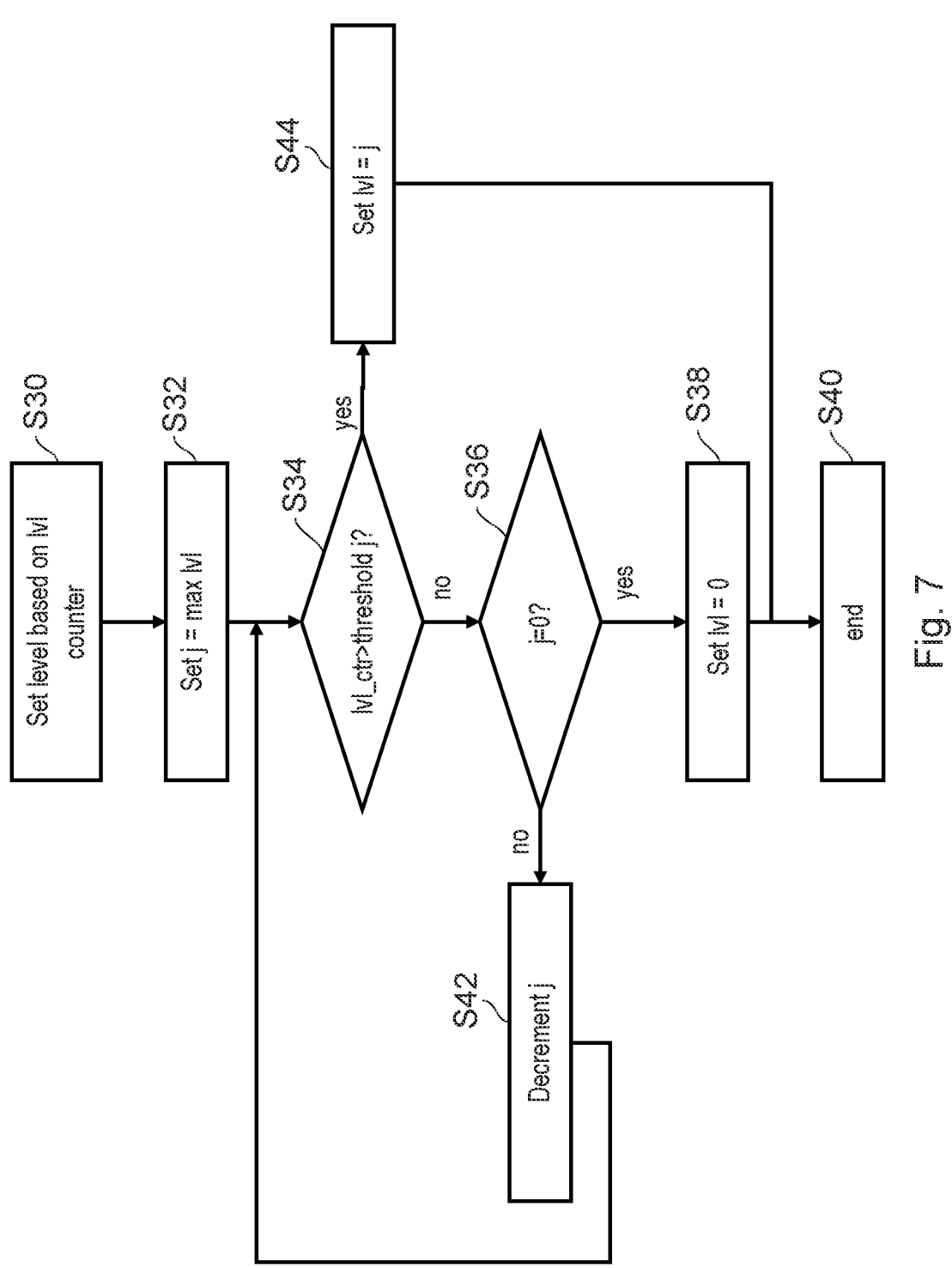
FIG. 7 schematically illustrates a sequence of steps that are carried out by a processing apparatus according to various configurations of the present techniques.

FIG. 7 schematically illustrates a sequence of steps that are carried out by a processing apparatus according when the lookup level is determined based on the trigger sensitivity metric (lvl counter) at step S22 of FIG. 6. FIG. 7 describes the process of setting the lookup level as an iterative procedure to determine which lookup level is appropriate based on the current trigger sensitivity metric. It would be appreciated that this flow is purely to illustrate the conceptual process of this determination and that alternative logic could be provided to determine the lookup level either iteratively or in parallel for all lookup levels. Flow begins at step S30 where it is determined that the lookup level is required to be set, Flow then proceeds to step S32 where a variable j is set to the maximum lookup level. Flow then proceeds to step S34 where it is determined if the currently proposed lookup level (lookup level j) is appropriate based on the trigger sensitivity metric (lvl_ctr). When the trigger sensitivity metric is greater than a threshold associated with lookup level j, it is determined that lookup level j is the correct lookup level and flow proceeds to step S44 where the current lookup level is set to level j. Step S44 may (optionally) include setting the lower lookup level to level j--1. Flow then proceeds to step S40 where the process of setting the lookup level ends.

If on the other hand, at step S34, it was determined that the trigger sensitivity level was below or equal to the threshold for level j, then it is determined that the currently proposed lookup level (lookup level j) is too sensitive for the current value of the trigger sensitivity metric. Flow then proceeds to step S36, where it is determined if the current proposed lookup level is level 0. If, at step S36, it is determined that the current proposed lookup level is level 0 then flow proceeds to step S38 where the current lookup level (lvl) is set to 0 and flow proceeds to step S40 where the process of setting the lookup level ends. If, at step S36 it was determined that the currently proposed lookup level is not level 0 then flow proceeds to step S42 where the proposed lookup level j is decremented. Flow then loops back to step S34. In this way the proposed lookup level is iterated until an appropriate lookup level is determined.

Figure 8:
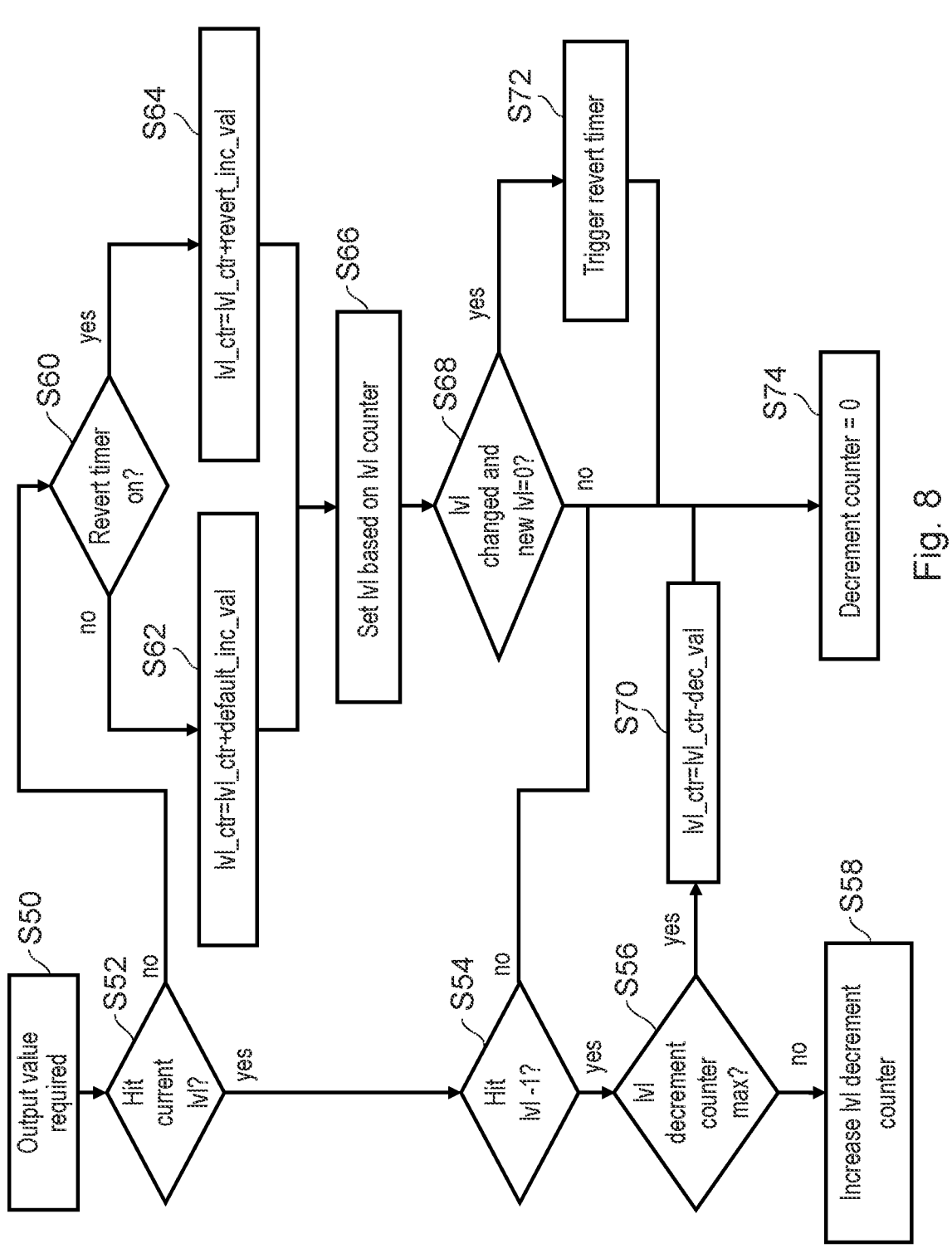
FIG. 8 schematically illustrates a sequence of steps that are carried out by a processing apparatus according to various configurations of the present techniques.

FIG. 8 schematically illustrates a sequence of steps that are carried out by a processing apparatus according, to various configurations of the present techniques in order to dynamically update the level counter. The process set out in FIG. 8 is similar to the process set out in FIG. 6, except when it is determined that there has been a false miss at the current lookup level in which case the process depends on whether the current lookup level has been dropped to lookup level zero (the least sensitive lookup level) within a period of time that is determined by a revert timer. The revert timer is on for a predetermined period of time and is off once that time has expired. Flow begins at step S50 where it is determined, by the downstream processing circuitry, that an output value from the processing unit was required. Flow then proceeds to step S52 where it is determined if there was a hit in the current lookup level (hit current lvl). If yes (true hit at current lookup level), then flow proceeds to step S54 where it is determined if there was also a hit in the lower lookup level (hit lvl–1). If yes (true hit at lower lookup level) then flow proceeds to step S56. At step S56 it is determined if the decrement counter has reached a maximum. If the decrement counter is not at a maximum value then flow proceeds to step S58 where the decrement counter is reduced and the flow terminates. In this case, the trigger sensitivity level is not modified as a result of the output value being required. If on the other hand, at step S56, it was determined that the level decrement counter was at the maximum, then flow proceeds to step S70 where the trigger sensitivity metric (lvl_ctr) is decremented by a decrement value. Flow then proceeds to step S74 where the decrement counter is reset and the flow terminates.

If on the other hand, at step S54 it was determined that there was not a hit in the lower level lookup (false miss at lower lookup level), then flow proceeds directly to step S74 where the decrement counter is reset and the flow terminates. In this case, the trigger sensitivity metric is not modified as a result of the output value being required. If on the other hand, at step S52 it was determined that there was not a hit in the current lookup level (false miss at current lookup level) then flow proceeds to step S60. At step S60 it is determined if the revert timer is on. If so then flow proceeds to step S64 where the trigger sensitivity metric is incremented by a revert increment value (boosted increment value) before flow proceeds to step S66. If on the other hand, at step S60, it was determined that the revert timer is not on, then flow proceeds to step S62 where the trigger sensitivity metric is incremented by a default increment value before flow proceeds to step S66. The revert increment value is larger than the default increment value and is used to rapidly revert a recent reduction in sensitivity (i.e., a reduction in sensitivity that has occurred sufficiently recently that the revert timer is still on). At step S66 the current lookup level is set based on the trigger sensitivity metric (for example, using the process described in FIG. 7). Optionally, the lower lookup level may also be set at step S66 (for example, to the level below the current lookup level). Flow then proceeds to step S78, where it is determined whether the lookup level has changed and that the current lookup level is level zero (the minimum level). If the outcome, at step S68 is yes the flow proceeds to step S72 where the revert timer is triggered before flow proceeds to step S74 where the decrement counter is reset and flow terminates. If on the other hand the outcome of step S68 was no, then flow proceeds to step S74 where the decrement counter is reset and the flow terminates.

Figure 9:
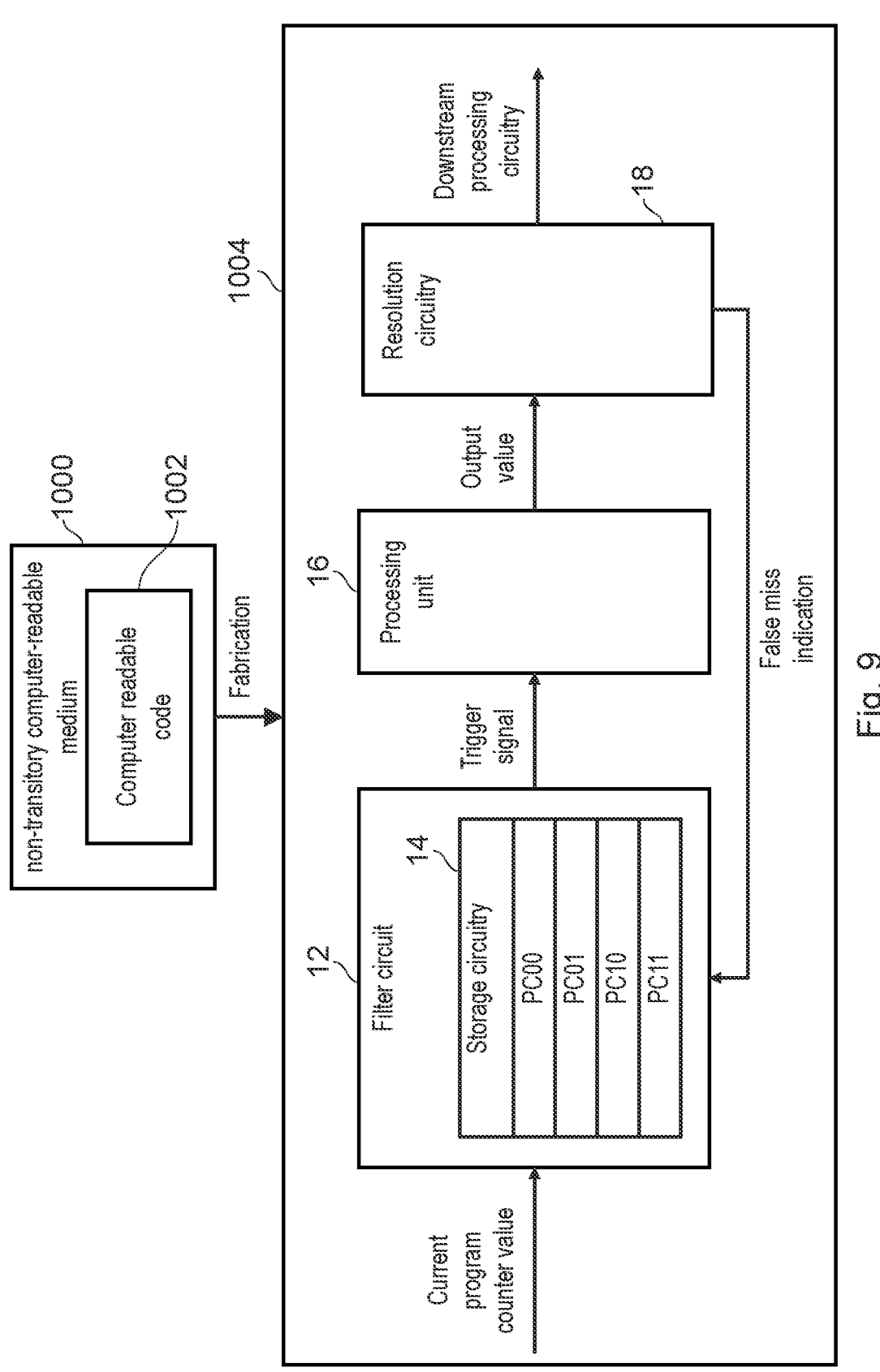
FIG. 9 schematically illustrates the use of a non-transitory computer-readable medium to store computer-readable code for fabrication of an apparatus according to various configurations of the present techniques.

FIG. 9 schematically illustrates the fabrication of a processing apparatus according to various configurations of the present techniques. Fabrication is carried out based on computer readable code 1002 that is stored on a non-transitory computer-readable medium 1000. The computer-readable code can be used at one or more stages of a.

semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as afield programmable gate array (FPGA) to configure the FPGA to embody the configurations described hereinabove or to facilitate the fabrication of an apparatus implemented as one or more integrated circuits or otherwise that embody the configurations described hereinabove. The fabricated design 1004 comprises the filter circuit 12, the processing unit 16 and resolution circuitry 18 as described in reference to FIG. 1.

In brief overall summary there is provided a data processing apparatus and method. The data processing apparatus comprises a filter circuit comprising storage circuitry to store program counter values and to assert a trigger signal in response to a lookup operation using a current program counter value hitting in the storage circuitry. The processing apparatus comprises a processing unit to generate an output in response to the trigger signal. The processing apparatus is provided with resolution circuitry, associated with a downstream processing stage, to determine whether the output is of use, and in that event to assert a false miss indication in the absence of the processing unit having been triggered to produce the output. The filter circuit is configured to maintain a trigger sensitivity metric in dependence on the false miss indication, and the chosen number of bits employed when performing the lookup operation is dependent on the trigger sensitivity metric.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative examples of the invention have been described in detail herein with reference to the accompanying drawings, it is to be understood that the invention is not limited to those precise examples, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A data processing apparatus comprising:
a filter circuit comprising storage circuitry to store information indicative of a default number of bits of program counter values associated with selected instructions, the filter circuit configured, in response to a current program counter value, to:
perform a lookup operation in the storage circuitry based on a chosen number of bits of the current program counter value; and
in response to a hit in the storage circuitry, assert a trigger signal;
a processing unit including processing circuitry and associated with a given processing stage of a plurality of sequential processing stages of a processing pipeline configured to execute processing instructions, the processing unit configured, in response to the trigger signal, to perform an operation in order to speculatively generate an output value in anticipation of that output value being of use to downstream processing circuitry associated with one or more downstream processing stages later in the plurality of sequential processing stages than the given processing stage; and
resolution circuitry associated with a downstream processing stage of the plurality of sequential processing stages, to determine whether the output value is of use to the downstream processing circuitry, and in that event to assert a false miss indication to the filter circuit in the absence of the processing unit having been triggered to produce the output value,
wherein the filter circuit is configured to maintain a trigger sensitivity metric that is updated in dependence on the false miss indication, and the chosen number of bits employed when performing the lookup operation is dependent on the trigger sensitivity metric.

2. The data processing apparatus of claim 1, wherein the filter circuit is configured, when seeking to reduce occurrences of false miss indications, to adjust the trigger sensitivity metric in order to reduce the chosen number of bits employed when performing the lookup operation, thereby increasing a range of program counter values for which the trigger signal is issued.

3. The data processing apparatus of claim 1, wherein the trigger sensitivity metric is used to identify a current trigger sensitivity level of a plurality of trigger sensitivity levels, and the chosen number of bits is dependent on the current trigger sensitivity level.

4. The data processing apparatus of claim 3, wherein the filter circuit is configured to determine a hit rate of a sequence of lookup operations performed at a lower trigger sensitivity level of the plurality of trigger sensitivity levels, and modify the trigger sensitivity metric based on the hit rate.

5. The data processing apparatus of claim 4, wherein the lower trigger sensitivity level is associated with a greater number of bits of the current program counter value than the current trigger sensitivity level.

6. The data processing apparatus of claim 4, wherein the hit rate indicates a number of consecutive hits within the sequence of lookup operations.

7. The data processing apparatus of claim 4, wherein:
the filter circuit comprises a decrement counter indicative of the hit rate; and
the filter circuit is configured to decrease the trigger sensitivity metric in response to the decrement counter reaching a decrement threshold.

8. The data processing apparatus of claim 3, wherein the filter circuit is configured, in response to the false miss indication, to increase the trigger sensitivity metric by an increment value.

9. The data processing apparatus of claim 8, wherein the filter circuit is configured to adjust the increment value in response to one or more given events.

10. The data processing apparatus of claim 9, wherein the increment value is dependent on an elapsed time since a given modification to the current trigger sensitivity level.

11. The data processing apparatus of claim 10, wherein:
when the elapsed time is greater than a threshold time, the increment value is a default increment value; and
when the elapsed time is less than a threshold time, the increment value is a boosted increment value greater than the default increment value.

12. The data processing apparatus of claim 10, wherein the given modification to the current trigger sensitivity level is a reduction of the current trigger sensitivity level.

13. The data processing apparatus of claim 12, wherein the reduction of the current trigger sensitivity level is a reduction to a minimum trigger sensitivity level.

14. The data processing apparatus of claim 1, wherein:

the processing unit is a polymorphic branch prediction unit arranged to produce, as the output value, a predicted target address for a polymorphic branch instruction; and the apparatus further comprises a branch target buffer to predict branch target addresses for branch instructions, wherein the branch target buffer is further arranged, for the current program counter value, to output, for reference by the resolution circuitry, a confirmation of whether the output value is of use to the downstream processing circuitry.

15. The data processing apparatus of claim 1, wherein the default number of bits is a contiguous default number of bits, or the default number of bits comprises fewer bits than a number of bits used to store the program counter values.

16. The data processing apparatus of claim 1, wherein the chosen number of bits is one of:

a number of most significant bits of the default number of bits; and a number of least significant bits of the default number of bits.

17. The data processing apparatus of claim 1, wherein the resolution circuitry is configured, in response to the processing unit having been triggered to produce the output value and a determination that the output value is not of use, to discard the output value.

18. The apparatus of claim 1, wherein the processing unit is responsive to the lookup operation resulting in a miss in the storage circuitry, to omit performing the operation to speculatively generate the output value.

19. A non-transitory computer-readable medium to store computer-readable code for fabrication of an apparatus comprising:

a filter circuit comprising storage circuitry to store information indicative of a default number of bits of program counter values associated with selected instructions, the filter circuit configured, in response to a current program counter value, to:

perform a lookup operation in the storage circuitry based on a chosen number of bits of the current program counter value; and in response to a hit in the storage circuitry, assert a trigger signal;

a processing unit including processing circuitry and associated with a given processing stage of a plurality of sequential processing stages of a processing pipeline configured to execute processing instructions, the processing unit configured, in response to the trigger signal, to perform an operation in order to speculatively generate an output value in anticipation of that output value being of use to downstream processing circuitry associated with one or more downstream processing stages later in the plurality of sequential processing stages than the given processing stage; and resolution circuitry associated with a downstream processing stage of the plurality of sequential processing stages, to determine whether the output value is of use to the downstream processing circuitry, and in that event to assert a false miss indication to the filter circuit in the absence of the processing unit having been triggered to produce the output value, wherein the filter circuit is configured to maintain a trigger sensitivity metric that is updated in dependence on the false miss indication, and the chosen number of bits employed when performing the lookup operation is dependent on the trigger sensitivity metric.

20. A method of operating a data processing apparatus comprising a filter circuit, the filter circuit comprising storage circuitry, the method comprising:

storing, in the storage circuitry, information indicative of a default number of bits of program counter values associated with selected instructions;

in response to a current program counter value:

performing, with the filter circuit, a lookup operation in the storage circuitry based on a chosen number of bits of the current program counter value; and in response to a hit in the storage circuitry, asserting, with the filter circuit, a trigger signal;

performing, at a given processing stage of a plurality of processing stages of a processing pipeline configured to execute processing instructions, in response to the trigger signal, an operation in order to speculatively generate an output value in anticipation of that output value being of use to downstream processing circuitry associated with one or more downstream processing stages later in the plurality of sequential processing stages than the given processing stage;

determining, at a downstream processing stage of the plurality of sequential processing stages, whether the output value is of use to the downstream processing circuitry, and in that event asserting a false miss indication to the filter circuit in the absence of the trigger signal being asserted to produce the output value; and maintaining, by the filter circuit, a trigger sensitivity metric that is updated in dependence on the false miss indication, wherein the chosen number of bits employed when performing the lookup operation is dependent on the trigger sensitivity metric.

* * * * *